(12) United States Patent
Crall et al.

(10) Patent No.: US 6,478,545 B2
(45) Date of Patent: Nov. 12, 2002

(54) FLUTED BLISK

(75) Inventors: David William Crall, Loveland, OH (US); John Robert Kelley, Cincinnati, OH (US); Ian Francis Prentice, Cincinnati, OH (US); Gregory Scott McNulty, Shelbyville, IN (US); Michael De Wayne Toye, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/801,119

(22) Filed: Mar. 7, 2001

(65) Prior Publication Data

US 2002/0127108 A1 Sep. 12, 2002

(51) Int. Cl.⁷ .............................. F01D 5/30; F01D 5/34
(52) U.S. Cl. .................. 416/213 R; 416/234; 29/889.1; 29/889.21; 29/889.23
(58) Field of Search .............................. 416/213 R, 234, 416/235, 236 R, 236 A, 228, 242, 223 A; 29/889.1, 889.21, 889.23; 415/181, 191, 914

(56) References Cited

U.S. PATENT DOCUMENTS

| | | | | |
|---|---|---|---|---|
| 3,982,854 A | * | 9/1976 | Berry et al. ............. 416/213 R |
| 4,883,216 A | * | 11/1989 | Patsfall ....................... 228/119 |
| 4,934,583 A | * | 6/1990 | Patshall ....................... 228/119 |
| 5,148,957 A | * | 9/1992 | Searle .......................... 228/2 |
| 5,197,190 A | * | 3/1993 | Coolidge ..................... 228/119 |
| 5,244,345 A |   | 9/1993 | Curtis .......................... 416/95 |
| 5,366,344 A | * | 11/1994 | Gillbanks et al. ......... 228/112.1 |
| 5,397,215 A |   | 3/1995 | Spear et al. ................. 415/191 |
| 5,468,334 A | * | 11/1995 | Searle .......................... 155/580 |
| 5,486,262 A | * | 1/1996 | Searle .......................... 156/580 |
| 5,755,031 A | * | 5/1998 | Baumgarten ................ 29/889.1 |
| 5,813,593 A | * | 9/1998 | Galaske, Jr. ................ 228/112.1 |
| 6,017,186 A |   | 1/2000 | Hoeger et al. ............... 415/181 |
| 6,095,402 A | * | 8/2000 | Brownell et al. ........ 228/112.1 |
| 6,106,233 A | * | 8/2000 | Walker et al. ........... 228/112.1 |
| 6,160,237 A | * | 12/2000 | Schneefeld et al. ......... 219/601 |
| 6,213,711 B1 | * | 4/2001 | Muller et al. ................ 415/191 |

FOREIGN PATENT DOCUMENTS

EP  887143 A1  12/1998

OTHER PUBLICATIONS

Harvey et al, "Non–Axisymmetric Turbine End Wall Design: Part I Three–Dimensional Linear Design System," ASME 99–GT–337, Jun. 7–10, 1999, pp: 1–9.
U.S. patent application Ser. No. 09/405,308, "Reduced–Stress Compressor Blisk Flowpath," by James E. Rhoda et al., 13DV13047.
U.S. patent application Ser. No. 09/643,012, "Method and Apparatus for Reducing Rotor Assembly Circumferential Rim Stress," by Stephen M. Carter, 13DV13561.
U.S. patent application Ser. No. 09/507,408, "Fluted Compressor Flowpath," by John J. Decker et al., 13DV13303.

* cited by examiner

Primary Examiner—Edward K. Look
Assistant Examiner—Richard A. Edgar
(74) Attorney, Agent, or Firm—Rodney M. Young; Francis L. Conte (57) ABSTRACT

A blisk includes a disk having a rim. A row of blades extends outwardly from the rib in a unitary construction. The blades are spaced apart in the disk rim to define fluted inner flowpath channels extending axially between the blades to bound corresponding flow passages therebetween.

20 Claims, 5 Drawing Sheets

FLUTED BLISK

BACKGROUND OF THE INVENTION

The present invention relates generally to gas turbine engines, and, more specifically, to blisks therein.

A gas turbine engine includes various stages of bladed disks in the compressor and turbine thereof which pressurize air in the former and expand hot combustion gases in the latter. The compressor blades or turbine blades are typically mounted to their supporting disks by dovetails which are radially retained in corresponding dovetail slots in the rims of the disks.

Advantages in performance, manufacture, and weight may be obtained by integrally forming the blades and disks in a unitary or one-piece construction known as a blisk. In one method of manufacture, the individual blades and features of the supporting disk are machined from a common blank of metal. Complex three dimensional machining is required to precisely obtain the required aerodynamic flow passages between the blades.

Since blisks may be damaged in the normal course of operation in a gas turbine engine before their useful lives have been met, it is desirable to repair the blisks. However, since the blades are integrally formed with the disk, they are not readily individually removable in the manner of bladed disks having dovetails.

Accordingly, either portions of an individual damaged blade may be removed by machining and replaced with a corresponding blade piece, or the entire damaged blade may be removed and replaced. In either example, the repaired blisk should be returned as close as possible to its original strength for completing its original useful life without undesirable early termination thereof Another form of blisk manufacture and repair uses translational friction welding for integrally welding individual blades to a disk. The disk is typically initially fabricated with a row of integral stubs extending radially outwardly from the rim of the disk. Each stub has a smooth weld surface which complements a corresponding smooth blade root for permitting friction welding therebetween.

Each blade initially includes a fixturing collar near the blade root so that compression and translation forces may be applied to the individual blade for developing friction at the weld surface as the blade is quickly oscillated during the welding process. The blade and stub material at the weld surface locally fuses to form a friction weld bond thereat, after which the resulting weld flashing and fixturing collar are removed by conventional machining for achieving the desired aerodynamic contour of the blade and rim surfaces.

Since the friction welding forces are substantial, the original rim stubs are provided oversize with excess material to prevent undesirable plastic deformation of the stubs and blade during friction welding. The excess material may then be removed by machining following the friction welding process.

However, in the event that repair of the blisk is desired and a complete blade must be removed, the remaining stub no longer includes the original excess material. The correspondingly smaller stub is therefore subject to undesirable deformation during the friction welding process of a replacement blade, which can damage the blisk and render it unusable for return to service in the engine.

Another problem with friction welding of blisks is the exposure to the environment along the edges of the weld surface as the blade is oscillated during welding. The original oversized stub and correspondingly oversized blade root provide additional surface area for decreasing the likelihood of environmental contamination at the resulting weld line. The excess material machined away after friction welding typically removes therewith any undesirable contamination around the weld surface. Since the stubs no longer have excess material for the repair operation, the weld surfaces are subject to environmental contamination.

These problems of typical friction welding are further compounded by the axial contour of the disk rim defining the inner flowpath boundary of the flow passages between adjacent blades. In a typical entry-stage configuration of a fan or compressor blisk, the blisk rim increases in diameter between its forward and aft ends, and typically has an arcuate contour therebetween which may have a generally S-shape. Accordingly, the stub weld surface typically follows the axial profile of the disk rim for maintaining the weld surface as large as possible.

Typical compressor blades have maximum thickness in their midchord regions, with correspondingly thin leading and trailing edges, and typically decrease in thickness from root to tip thereof. The rim stub and the blade root therefore typically have complementary arcuate weld surfaces for maximizing the surface area and reducing distortion during the friction welding process.

Since the weld plane is arcuate, both the rim stub and blade root require precise three dimensional machining to create closely matching surfaces for achieving complete friction welding. And, the arcuate weld surface can only be translated in the axisymmetric direction circumferentially around the disk rim. This circumferential or lateral frictional oscillation of the blade on its corresponding stub is rendered more difficult when conducted between two adjacent blades already welded to their stubs.

Accordingly, it is desired to provide a blisk having an improved configuration of the weld plane for advantages in both original manufacturing thereof as well as during subsequent repair.

BRIEF SUMMARY OF THE INVENTION

A blisk includes a disk having a rim. A row of blades extends outwardly from the rim in a unitary construction. The blades are spaced apart in the disk rim to define fluted inner flowpath channels extending axially between the blades to bound corresponding flow passages therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
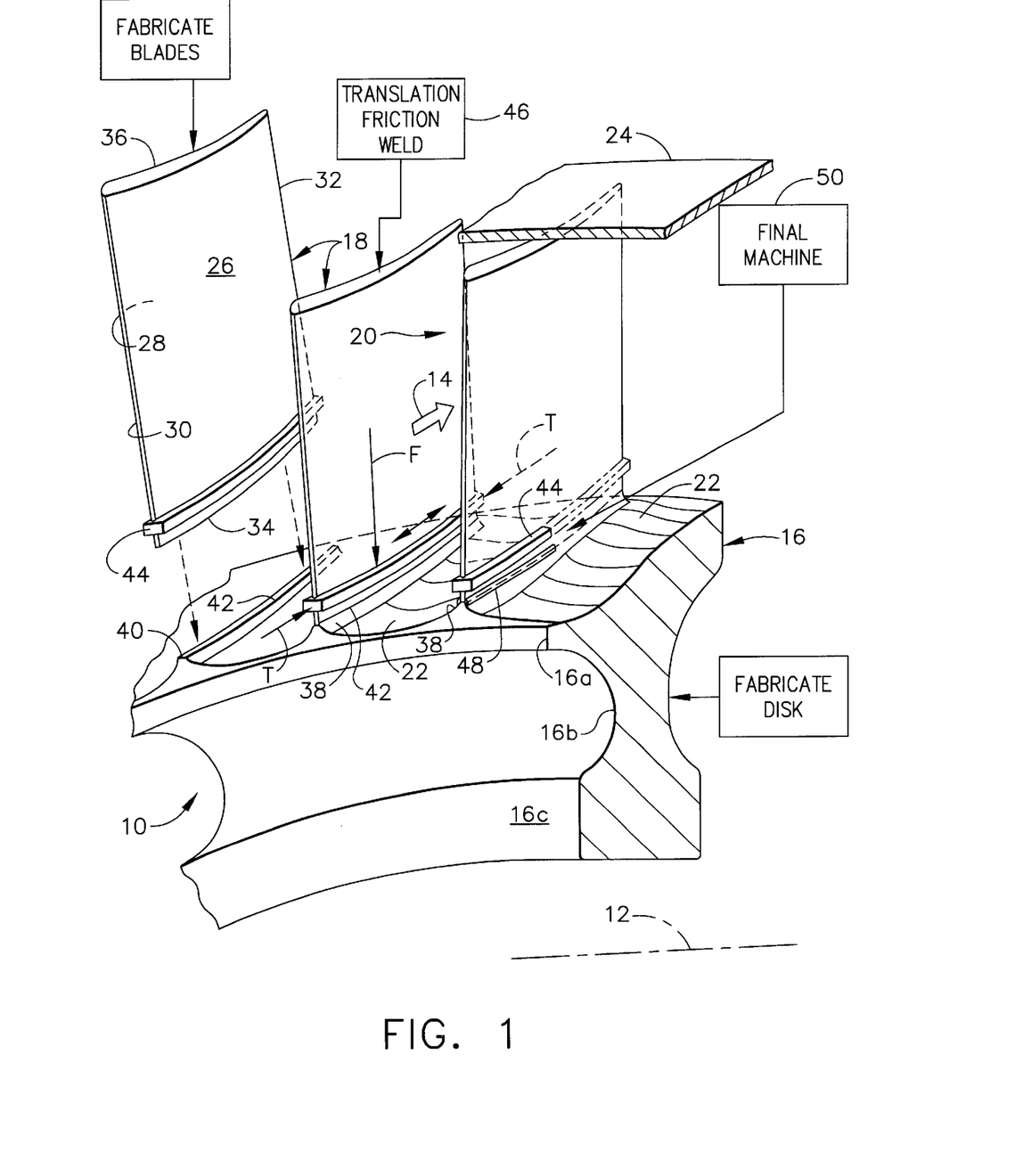
FIG. 1 is an isometric view of a portion of a gas turbine engine compressor blisk and a schematic method of manufacture thereof.

Illustrated in FIG. 1 is a portion of an annular blisk 10 which is generally axisymmetrical about a longitudinal or axial centerline axis 12 thereof. The blisk is configured for use in a gas turbine engine, and is in the exemplary form of a compressor or fan blisk for pressurizing air 14 during operation.

The blisk includes an annular disk 16 which includes an axially wide rim 16a, a narrower web 16b, and a wider hub 16c in a unitary construction.

A row of compressor rotor blades 18 extends radially outwardly from the rim 16a in a unitary or one-piece construction therewith for defining the completed blisk. As indicated above, the blades are integral with the disk and do not include typical dovetails which would otherwise permit their ready removal or insertion in the form of a conventional bladed-disk.

Each blade may have any conventional aerodynamic configuration for pressurizing the air during operation and defines with its circumferential neighbor a corresponding flow passage 20 through which the air 14 is channeled during operation. The disk rim 16a includes an inner flowpath channel 22 between each of the adjacent blade pairs which extends axially along the blades and between the forward and aft ends of the rim disposed on axially opposite sides thereof The inner channel 22 defines the radially inner boundary of the flow passage 20, and the radially outer boundary of the flow passage is typically defined by a surrounding annular casing or shroud 24 of any conventional configuration. In this way, as the blisk rotates during operation within the stationary shroud 24 corresponding flow passages 20 are defined between each blade pair through which the air is channeled for being pressurized or compressed.

Each blade 18 includes a generally convex suction side 26 and a circumferentially opposite generally concave pressure side 28 extending axially or chordally between opposite leading and trailing edges 30,32, and radially along the span axis from root 34 to tip 36. In accordance with the present invention, the inner flowpath channels 22 are fluted for providing substantial advantages in manufacture, repair, and aerodynamic performance.

More specifically, conventional blisks have axisymmetric inner flowpaths which are surfaces of revolution around the axial centerline axis. Axisymmetric surfaces are correspondingly convex outwardly and are readily machined during the manufacturing process.

In contrast, the fluted channels 22 are not surfaces of revolution relative to the centerline axis 12, and are thusly non-axisymmetric, but, instead, are circumferentially arcuate between adjacent blades and join the blades at corresponding arcuate fillets 38. Furthermore, each of the fluted channels 22 is preferably asymmetric circumferentially between adjacent blades relative to the primary axial flow direction of the air along the flutes and between the forward and aft ends of the disk rim.

Each of the fluted channels 22 has a generally concave profile or contour extending radially inwardly toward the centerline axis 12, and varies in that contour axially along the bounding blades 18 between the forward and aft ends of the disk rim. Whereas the typical axisymmetric inner flowpath of a blisk is generally convex, the fluted channels are generally concave and opposite thereto.

Figure 2:
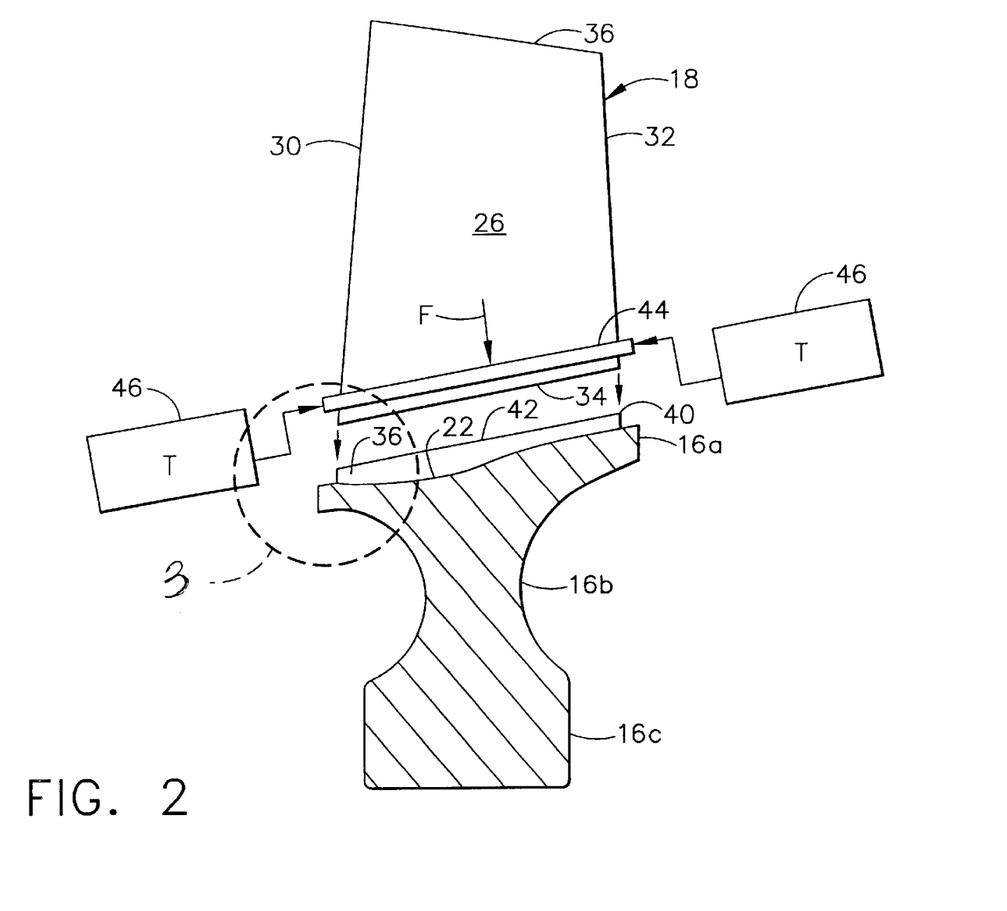
FIG. 2 is a radial sectional view of the blisk illustrated in FIG. 1 and schematic representation of translation friction welding thereof.

A particular advantage of the fluted channels 22 is corresponding improvement over the original manufacture or fabrication of the blisk and repair thereof More specifically, the disk rim 16a illustrated in FIGS. 1 and 2 includes integral or unitary planar stubs 40 each having a planar weld surface or flat plane 42 which complements the corresponding blade root 34, which is also planar or flat.

The stubs and roots are frictionally welded together to form a fused or weld-bonded joint therebetween for integrally joining all the blades to the disk to form the unitary or one-piece construction thereof. The welded blades thus become an integral part of the disk and are not readily removable therefrom without a machining or cutting operation.

Of particular significance in this blisk construction is the weld plane 42 being disposed in the fillets 38, instead of being disposed radially outwardly therefrom in thinner sections of the resulting blade or stub. As indicated above, translation friction welding requires substantial friction forces between a blade and rim stub, and if the stubs are too narrow or thin then undesirable deformation of the blade and stub may occur during the process which can adversely affect the final configuration of the welded blade. Weak stubs are prone to distortion, with strong stubs being desired.

Also indicated above is that the stubs and blade roots may be initially made suitably oversize for increasing the strength thereof for undergoing the friction weld process, but such oversize is not available in the stubs for subsequent repair.

Accordingly, by initially locating the weld planes 42 in the fillets of the stubs 40, the additional width of the stub at the fillets substantially increases the strength thereof and better withstands the large friction welding forces.

However, locating the weld planes within the stub fillets is not readily accomplished in view of the typical three dimensional configuration of the disk rim 16a. If the outer surface of the rim were purely cylindrical, then straight stubs with uniformly small fillets could be readily used.

However, the disk rim 16a illustrated in FIGS. 1 and 2 is representative of typical compressor blisks in which the rim increases in diameter between its forward and aft ends and is not simply cylindrical. Accordingly, the fluted channels 22 correspondingly diverge radially outwardly between the forward and aft ends of the disk rim and correspondingly increase in radius from the blisk centerline axis. Notwithstanding the variable axial profile of the disk rim, the weld planes 42 remain flat or planar and are suitably tilted to vary in radial distance from both the blisk centerline axis and the corresponding fluted channels 22 extending axially between the opposite ends of the disk rim.

Since the disk rim varies in diameter and contour between its forward and aft ends, a conventional stub would also vary in contour for maintaining a relatively small and constant fillet along the disk rim for maximizing aerodynamic performance of the flow passage while maintaining the desired flow area thereof. However, the variable contour stubs resulting therefrom are undesirable for the several reasons presented above.

Equally undesirable is the simple introduction of a planar stub generally conforming with the variable contour of the disk rim which would inherently position the weld plane at relatively thin portions of the blade at either its leading or trailing edges or chordally therebetween at locations radially outwardly of the stub fillets. It is undesirable to merely increase the size of the fillets to reach the varying diameter weld plane because those fillets directly affect aerodynamic performance of the blades including the required flow area of the passages.

Accordingly, by introducing the fluted channels 22 instead of typical surface-of-revolution flow channels, the weld plane 42 may remain flat over its entire extent between the leading and trailing edges of the blade while being positioned within the corresponding fillets 38 for maintaining structural integrity of the stubs and resistance to friction welding without compromising aerodynamic performance. As shown in FIGS. 1 and 2, the fluted channels 22 vary in radial depth preferably non-linearly between the forward and aft ends of the disk rim, and the weld plane 42 correspondingly varies in radial position inside the fillets 38 axially between the opposite ends of the rim.

As initially shown in FIG. 1, the fluted channels 22 vary in circumferential profile or contour and have a maximum sectional depth skewed or swerved toward the blade suction sides 26 axially between the forward and aft ends of the disk rim 16a. This general contour of the fluted channels results from the manner of originally making the blisk to accommodate the contradictory objectives of a planar weld surface inside correspondingly small fillets with a disk rim varying in diameter and axial contour between the forward and aft ends thereof.

More specifically, FIG. 1 also illustrates schematically a method of making the blisk 10 in accordance with a preferred embodiment. The disk 16 without the blades is initially fabricated in any conventional manner such as by forging and machining to produce the desired planar stubs 40 extending radially outwardly from the disk rim, preferably suitably oversized.

The individual blades 18 are fabricated in any conventional manner such as by forging and machining as desired. In this way the individual fabrication of the blades permits precise control of the various dimensions thereof without obstruction by any other blade or the disk which typically occurs in the machining in the blisk and blades from a common blank.

Each blade 18 is preferably fabricated with an integral fixturing collar 44 disposed closely radially above the planar root 34 thereof Translation friction welding equipment 46 of any conventional configuration is then used for friction welding the planar root 34 to the corresponding planar stub 40 for each of the blades by translating and reciprocating the collar 44 axially or chordally. As shown in general in FIGS. 1 and 2, and in more detail in FIG. 3, the welding equipment produces a radially inwardly directed compression or upset force F through the collar 44 to create substantial friction forces as the collar 44 is oscillated under translation force T in rapid motion to locally fuse the blade root to the rim stub to form a weld joint along the weld plane.

Figure 3:
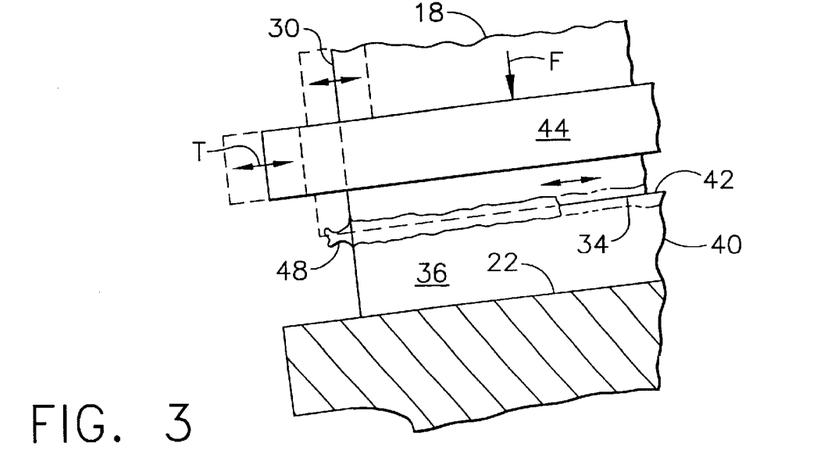
FIG. 3 is an enlarged elevational view of a portion of the welding joint between the blade and disk illustrated in FIG. 2 within the dashed circle labeled 3.
Figure 4:
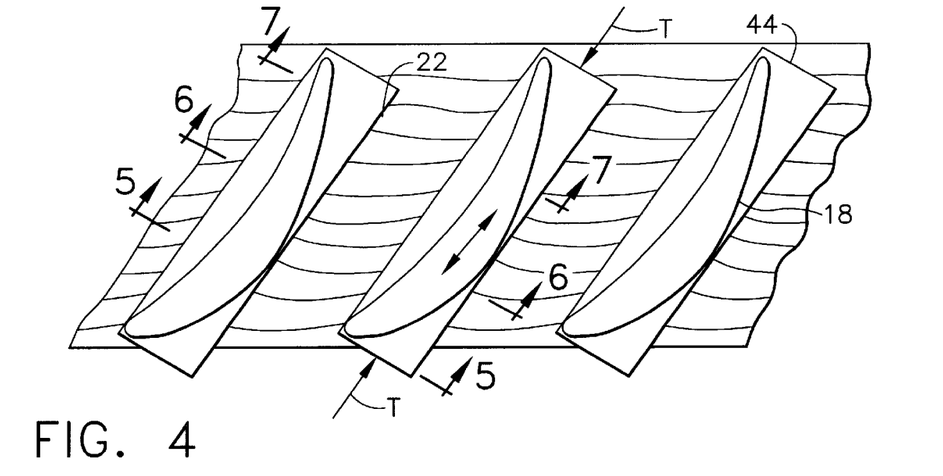
FIG. 4 is a top planiform view of a portion of the blisk illustrated in FIG. 2 showing three adjacent blades having corresponding fluted inner flowpath channels extending in width circumferentially therebetween.

As shown in FIGS. 3 and 4, translation of the blade 18 during the friction welding process preferably occurs in the chordal direction along the greatest length of the stub 40 as opposed to its substantially narrower circumferential width.

In this way, as the blade is oscillated during friction welding as illustrated in FIG. 3, only small portions at the opposite leading and trailing edges of the blade at the roots 34 are exposed to the environment for substantially reducing environmental contamination of the weld plane. Both sides of the blade root 34 remain directly in contact along both sides of the stub 40 during the welding process with correspondingly little chance of environmental contamination thereat.

As the friction welding process continues, the metal surfaces of the blade root and stub fuse together in a strong weld over the entire planar extent of the welding surfaces resulting in a mushrooming weld flashing 48 which projects laterally outwardly around the full perimeter of the weld joint which typically removes any environmental contamination introduced by the friction welding process.

As illustrated in FIG. 1, a conventional milling or grinding tool 50 may then be used for machining away the collar 44 and the weld flashing 48 at the weld plane 42 to complete or finally machine the blade roots and fillets 38 thereat.

Figure 5:
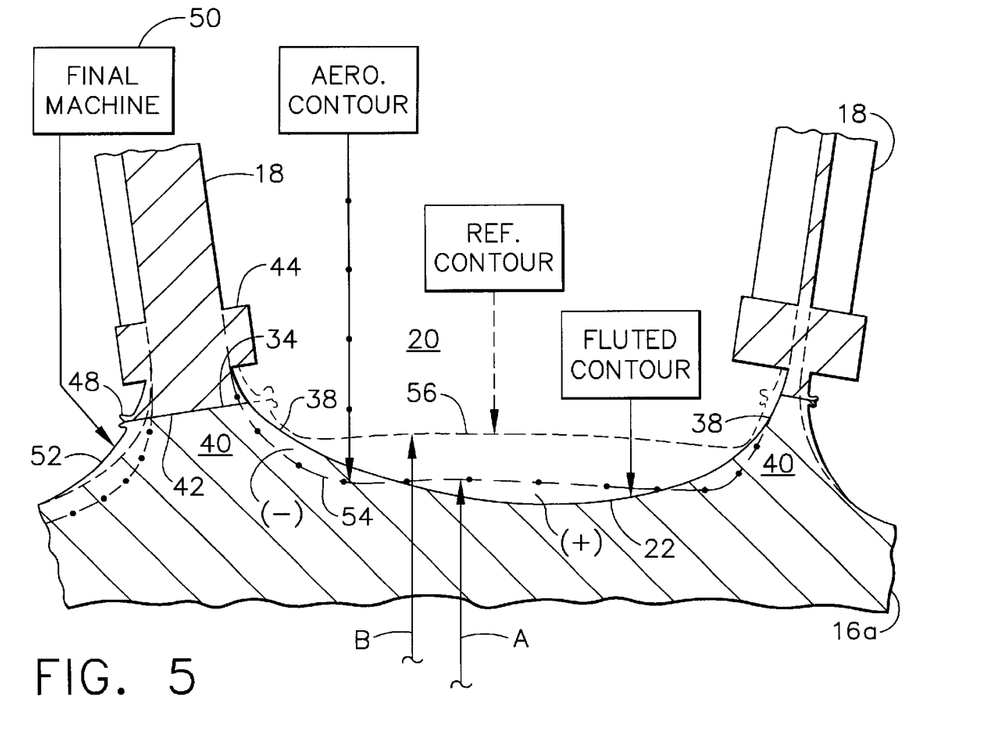
FIG. 5 is a radial sectional view of an exemplary fluted flow channel illustrated in FIG. 4 and taken along 5—5 near the blade leading edges.

FIG. 5 illustrates in more detail an exemplary section of the fluted contour 22 near the leading edges of the blades, and the preferred manufacturing process therefor. Also indicated in FIG. 5 is the local addition of excess material 52 at both sides of the blade root 34, and the complementary stub 40 used during the original manufacture, if desired, which is finally machined after the welding process to achieve the desired final dimensions of the fluted contour 22 and fillets 38. The excess material 52 may be used where desired locally at the stubs and blade roots as well as over the entire disk rim, or not as desired.

FIG. 5 also illustrates schematically a preferred method of fabricating the disk for obtaining the placement of the weld plane 42 in the stub fillets 38, and the resulting fluted contour of the inner flowpath channel 22 between the adjacent blades and stubs.

As indicated above, the blades 18 and their inner flowpath channels 22 define in most part the flow passages 20 disposed therebetween through which the air is channeled during operation. The configuration of the flow passage is defined by the contours of the blades and inner channel 22, and various analytical tools are conventionally available for defining the configuration of the flowpath for achieving optimum aerodynamic performance in each stage of the fan or compressor as appropriate.

Conventional analytical tools include two-dimensional aerodynamic computational codes or software for defining the flowpath configuration and blade shape in accordance with specific aerodynamic requirements or performance of the stage.

Three dimensional aerodynamic computational codes or software are also conventionally available for determining flowpath configuration in accordance with the desired aerodynamic performance requirements. However, three dimensional computation is substantially more complex than two dimensional computation and therefore requires more computational effort and time, and associated cost.

Accordingly, irrespective of the type of computational software available, the disk 16 is initially evaluated by analytically defining the desired fluted contour of the inner flowpath channels 22 between the stubs 40 of the disk rim to achieve the desired or optimum aerodynamic performance required by the blisk, including the corresponding flow areas and surface curvature or contour of the flow passages 20 between the blades. Three dimensional computational codes in a corresponding digitally programmable computer may be used to simultaneously determine the required fluted contour of the channel 22 in conjunction with the fillets 38, with the weld planes 42 disposed therein.

By predetermining the required fluted contour, the disk 16 may then be fabricated in any conventional manner, with the stubs 40 and channels 22 corresponding with the analytically determined fluted contour thereof, for positioning the weld planes 42 in the fillets 38. As illustrated in FIGS. 2 and 4, the fluted channels 22 extend axially between the forward and aft ends of the disk rim, and therefore the analytical definition thereof must include all sections over the full axial extent of the blades and stubs, while both maintaining the flat or planar weld surface within corresponding fillets without compromising aerodynamic performance.

As indicated above, iteratively predicting the required contour of the fluted channels 22 would normally require substantial computational effort using a three dimensional computational code.

A simplified procedure may be used for defining the fluted contour 22. As illustrated initially in FIG. 5, an aerodynamic analysis may first be conducted to define an aerodynamic contour 54 to achieve the optimum or desired aerodynamic performance and corresponding surface contours and flow areas of the passages 20, without regard to the location of the weld planes 42.

As indicated above, two dimensional computer codes are conventionally available for use in a digitally programmable computer to represent in two dimensions the aerodynamic performance of the blisk to define the aerodynamic contour 54 of the flow passages, including the inner boundary flow channels for corresponding aerodynamic performance including the desired static pressure distribution in the flow passages. If desired, 3D aerodynamic codes may be used to refine the initial aerodynamic contour 54.

The aerodynamic contour 54 is typically defined as a surface of revolution for the inner flowpath of the passages 20 and is axisymmetrical about the centerline axis of the blisk. This aerodynamic contour is also defined by the corresponding pressure and suction sides of the adjacent blades.

Since that aerodynamic contour 54 must necessarily follow the increase in diameter of the disk rim between its forward and aft ends as illustrated in FIG. 2, the resulting axial profile thereof is generally S-shaped which will correspondingly result in a varying radial distance to the desired straight or flat weld plane 42.

Accordingly, the position of the weld plane 42 may be chosen in any suitable best fit based on trial and error or sound engineering judgment relative to the analytically produced aerodynamic contour 54 in an attempt to position the weld plane relatively close to the inner flowpath in the desired fillets therewith.

In this way, the weld plane 42 is positioned within suitable fillets 38 of conventional configuration for manufacturing purposes, but the reference contour 56 does not have any aerodynamic utility except as provided by the fillets. Fillets are commonly used at the junctions of structural elements for reducing stress concentration thereat. Typical fillets may have single or multiple radii in transition, or may be infinitely variable in radius as desired for a particular junction between structural elements.

In a typical blisk construction, the blisk rim is axisymmetric with a common diameter surface of revolution between blades which then transitions abruptly at the radially outwardly extending blades. The abruptness of the transition is improved by the use of suitable fillets thereat for structural and aerodynamic performance.

Figure 6:
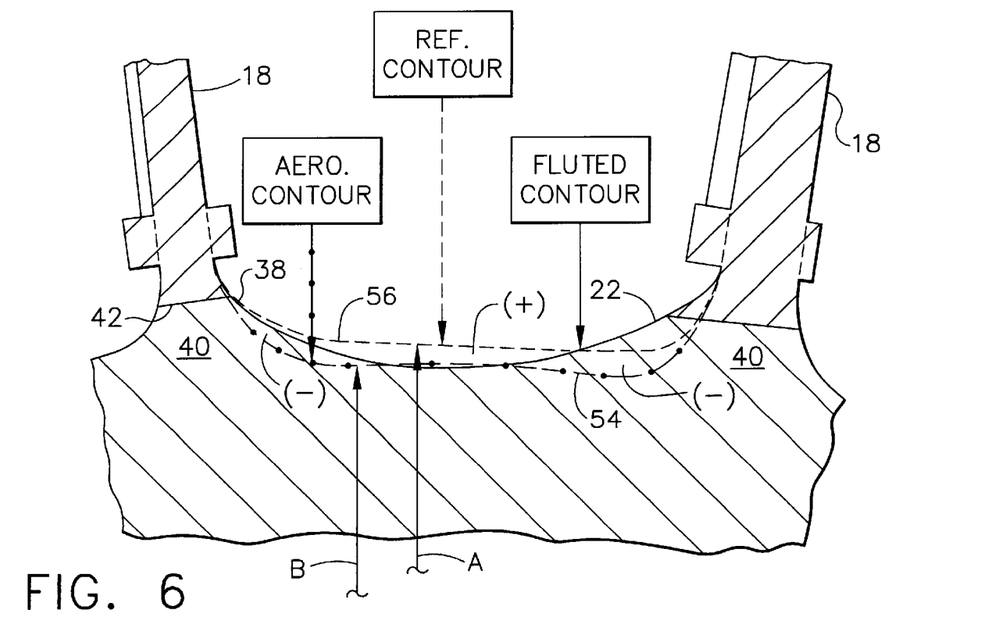
FIG. 6 is radial sectional view of the fluted channel illustrated in FIG. 4 and taken along line 6—6 in the blade midchord region.
Figure 7:
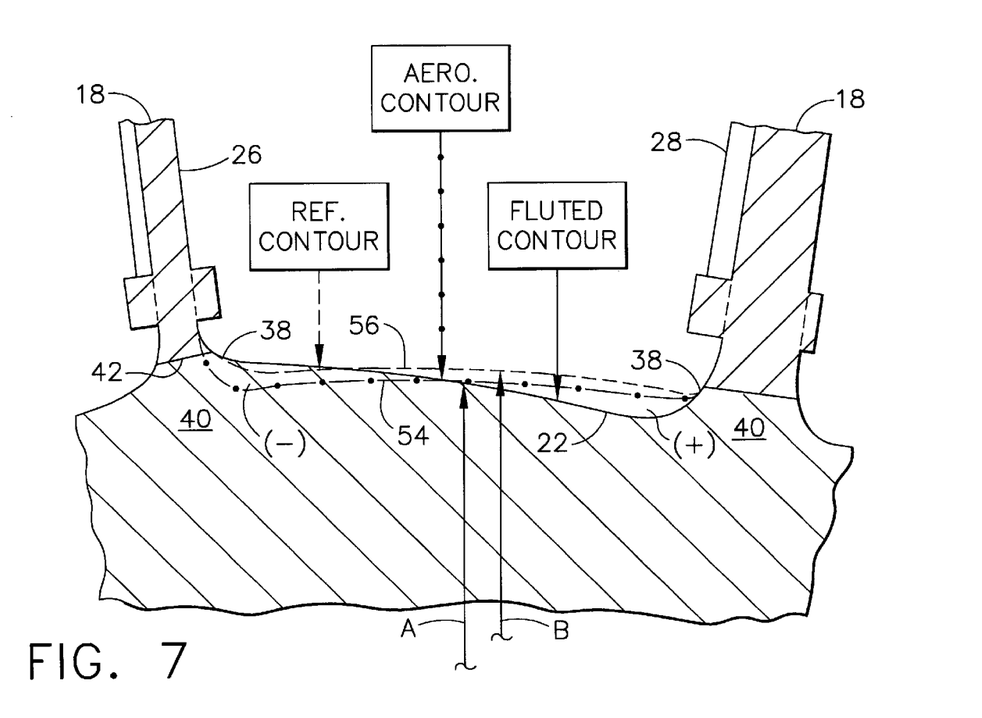
FIG. 7 is a radial sectional view of the fluted channel illustrated in FIG. 4 and taken along line 7—7 near the blade trailing edges.

The reference contour 56 illustrated in FIG. 5 is again axisymmetric or a surface of revolution controlled in most part by locating the weld planes 42 in the corresponding fillets 38 at all the axial sections of the stub between the forward and aft ends of the disk rim as represented by the exemplary sections illustrated in FIGS. 5, 6, and 7. In this way, the weld plane 42 is best fit in accordance with engineering judgement or trial and error in the corresponding fillets 38 at each section of the stubs between the rim ends.

At each axial location of the stubs between the disk ends, there will likely be a difference between the passage area as defined by the reference contour 56 and the area required for aerodynamic performance as defined by the aerodynamic contour 54.

The fluted contour 22 is initially defined between the fillets 38 of the reference contour 56 to match the flow area of the aerodynamic contour 54. As shown in FIG. 5, the fillets 38 of the reference contour reduce (−) local flow area relative to the aerodynamic contour, and the fluted contour is configured to have concave flutes or recesses extending radially inwardly to locally provide additional flow area (+) to offset the loss of flow area due to the desired fillet shape.

As indicated above, the aerodynamic contour 54 and the reference contour 56 are conventionally determined and are axisymmetric or surfaces of revolution between the fillets, as represented by corresponding radii A,B therefor. The actual radius A,B for each axial section of the flow passage is determined for each particular configuration and may be closely similar, with one or the other being greater than the other, and possibly changing in orientation between the forward and aft ends of the disk rims. FIGS. 5–7 are greatly exaggerated representations of these two contours 54,56 for purposes of illustration only.

Nevertheless, the two contours 54,56 are inherently axisymmetric by the design practice described above whereas the fluted contour 22 is inherently not a surface of revolution nor axisymmetric in the manner of the two contours 54,56, but in contrast is typically asymmetric relative to the two axisymmetric contours, and along the axial flow direction of the fluted channel 22.

As shown in FIG. 5, the fillets 38 may be defined in conjunction with the reference contour 56 for locating the weld planes 42 within the fillets for maximizing the strength of the stubs for friction welding. As indicated above, it is not desirable to locate the weld planes 42 radially outwardly of the fillets at any location along the axial extent of the individual stubs 40 in view of the correspondingly smaller thickness of the stub which could lead to undesirable deformation thereof during the friction welding process.

However, although the reference contour 56 corresponds with desirable fillets 38, the remainder of the reference contour between the opposite fillets in each flow passage 20 does not meet the optimum aerodynamic performance for the flow passage, and typically includes a passage area different than the optimum passage flow area.

Accordingly, the desired contour of the fluted channel 22 may be obtained by locally altering the inner flowpath between the fillets 38 from the reference contour 56 to the nonaxisymmetric fluted contour 22 to initially obtain the same passage flow area for the fluted channel 22 as that analytically determined for the aerodynamic contour 54.

After defining the initial configuration of the fluted contour 22, 3D aerodynamic analysis is conducted for the inter-blade flow passage to determine the aerodynamic performance thereof. The configuration of the fluted contour 22 between the fillets 38 may then be iteratively changed, along with that of the blades, to optimize the aerodynamic performance, irrespective of the flow passage area.

The three dimensional aerodynamic analysis includes the desired fillets 38 for maintaining the weld planes 42 therein, and is used to determine the required changes in the inner flowpath to achieve the optimum aerodynamic performance, with a corresponding flow passage area. The resulting fluted channels 22 typically vary in circumferential contour relative to the two contours 54,56.

As illustrated in FIG. 5, the fillets 38 at the left and right of the center fluted channel 22 are radially higher than the corresponding portions of the aerodynamic contour 54 resulting in a local loss (−) of passage flow area. Accordingly, the center portion of the fluted channel 22 extends radially inwardly more than the corresponding portion of the aerodynamic contour 54 for locally increasing (+) flow area to offset the loss of flow area under the left and right fillets. In this way, the flow passage area may be initially maintained by adjusting the inner flowpath contour between the desired contours of the two fillets 38 for maintaining the total flow passage area predicted for the aerodynamic contour 54. And then, the contour of the fluted channel 22 may be further optimized without restraint of the passage flow area.

FIG. 5 illustrates the contour of the fluted channel 22 near the blade leading edges at the forward end of the disk rim, with the channel 22 having a maximum depth generally in the circumferential middle between the two adjacent stubs 40. Preferably, the forward end of the disk rim is circular, and the fluted channel 22 commences thereat and increases in depth in the downstream direction as required for optimizing aerodynamic performance of the flow passage between adjacent blades.

FIG. 6 illustrates a different contour of the fluted channel 22 near the midchord of the blades between the forward and aft ends of the disk rim, with the maximum depth of the fluted channel being skewed closer to the suction side 26 of the blades relative to the pressure side 28 of the adjacent blade. Note the greater loss (−) of flow passage area near the right, pressure-side fillet than near the left, suction-side fillet. Note also the locally added flow area near the suction-side fillet which cooperates with the blade suction side having locally high flow velocities for increasing aerodynamic performance thereof.

And, FIG. 7 illustrates the further different contour of the fluted channel 22 near the blade trailing edges at the aft end of the disk rim. The maximum depth of the fluted channel is reduced in magnitude to blend with the circular aft end of the disk rim, and is now skewed closer to the pressure-side fillet of the adjacent blade. Note the loss (−) of flow passage area near the left, suction-side fillet, with offsetting increase (+) in flow area near the right, pressure-side fillet.

FIGS. 4–7 illustrate that the weld plane 42 may be located within the fillets bounding each stub 40 along the entire length of the individual stubs notwithstanding the varying diameter of the fluted channel which typically increases between the forward and aft ends of the disk rim. The weld plane 42 remains flat and within the fillets 38 for the full axial length of the stubs notwithstanding the variations in radius of the fluted channel, with the circumferential contour of the fluted channel varying as necessary to achieve the desired optimum aerodynamic performance at each axial section of the disk rim while smoothly blending with the corresponding fillets 38 which transition the stubs to the corresponding root ends of the individual blades.

In the various configurations of the fluted channel illustrated in FIGS. 5–7, the specific profile of the fillets 38 is at least as large as the reference contour 56 in the vicinity of the weld planes 42, and then varies smoothly circumferentially to locally increase or decrease the flow passage area relative to the desired aerodynamic contour of the flow passage to achieve optimum aerodynamic performance.

As indicated above, a primary reason for reconfiguring the inner flowpath channel 22 is to permit subsequent repair of the blisk by replacement of individual blades using the translation friction welding process. As illustrated schematically in FIG. 8, the blisk may be repaired by removing any one or more damaged blades 18d from the disk rim at or near the original weld plane 42. The damaged blade may be suitably cut away from the rim, with the weld plane 42 being precisely milled using the conventional milling tool 50, for example, to leave the planar stub 40 in much the same configuration as the original stub, except without being laterally oversized.

Figure 8:
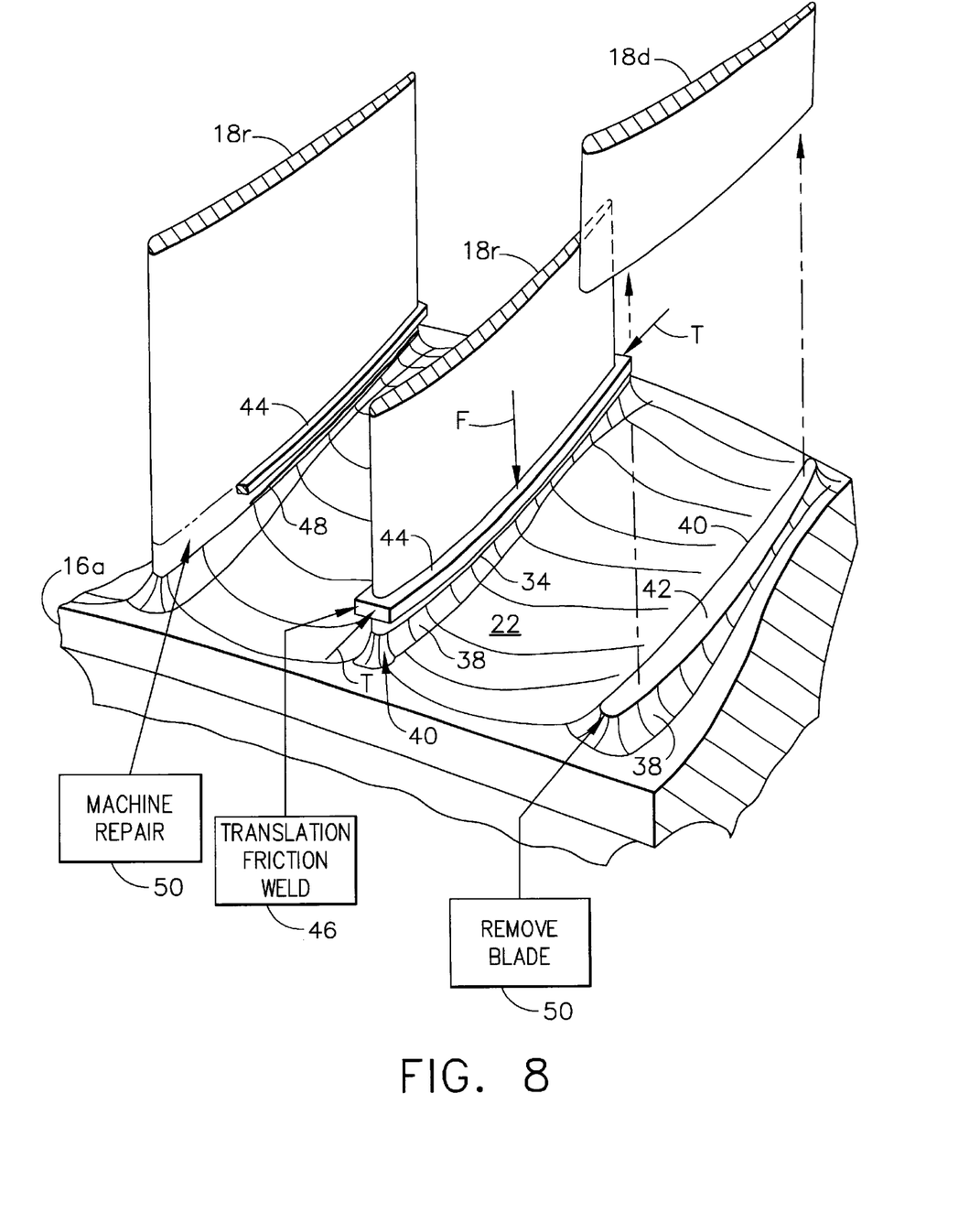
FIG. 8 is an isometric view, like FIG. 7, of the blisk being repaired in accordance with an exemplary embodiment.

A replacement blade 18r, substantially identical to the original blade, includes the fixturing collar 44 near the root end thereof which is suitably mounted in the translation friction welding machine 46, which is then used for friction welding the replacement blade to the stub by again translating chordally the collar in the same manner as described above with respect to FIG. 1.

Since the weld plane 42 is positioned within the opposite fillets 38 on both sides thereof, the stub 40 is relatively rigid and permits friction welding without undesirable distortion thereof under the large upset loads applied.

Repair of the individual blade is then completed by machining away the fixturing collar 44 from the replacement blade, and machining away the weld flashing 48 from the weld plane to return the blade root to substantially the same contour of the original fillets 38, or slightly less as the repair requires.

By the simple introduction of the fluted channel 22 defining the inner flowpath boundary between the adjacent blades of the blisk, the weld surface 42 may be flat or planar over its entire axial length and remain within the structurally reinforcing fillets 38 on opposite sides thereof Translation friction welding of the individual blades to the corresponding stubs is readily effected with the benefits described above, while the resulting blisk maintains optimum aerodynamic performance.

An additional advantage of using the fluted channels 22 is that their three dimensional contours may be used to advantage for increasing aerodynamic performance of the blisk beyond that possible from the conventional axisymmetric inner flowpaths of typical blisks.

The additional degree of freedom allowed by the non-axisymmetric flowpath can be used to improve the aerodynamic performance through better flow control near the hub through optimized passage area and surface curvature distributions. This improved performance may be obtained with the important additional constraint of maintaining the fillet location relative to the weld. And, by careful control of the weld location relative to the peak steady hoop stress in the disk rim, the flowpath shape along a section normal to the primary flow direction can be effective to reduce peak hoop stress in the fillet.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A blisk comprising:
   a disk including a rim;
   a row of blades extending radially outwardly from said rim in a unitary construction therewith to define corresponding flow passages therebetween; and
   said disk rim includes fluted inner flowpath channels extending axially between said blades for bounding said passages, with each of said fluted channels extending circumferentially between adjacent blades and having a circumferentially concave contour therebetween.

2. A blisk according to claim 1 wherein each of said fluted channels joins said blades at corresponding arcuate fillets.

3. A blisk according to claim 2 wherein each of said fluted channels is asymmetric circumferentially between said blades.

4. A blisk according to claim 2 wherein said concave contour varies axially along said blades.

5. A blisk according to claim 2 wherein said disk rim includes integral stubs each having a weld plane welded to a planar root of a corresponding blade, and said weld plane is disposed in said fillets.

6. A blisk according to claim 5 wherein said disk rim includes axially opposite forward and aft ends; said fluted channels diverge radially outwardly therebetween; and said weld planes vary in radial distance from said fluted channels axially between said rim forward and aft ends.

7. A blisk according to claim 6 wherein said fluted channels vary in depth nonlinearly between said rim forward and aft ends, and said weld plane varies in radial position inside said fillets between said rim forward and aft ends.

8. A blisk according to claim 6 wherein said fluted channels vary in circumferential contour relative to a corresponding axisymmetric reference contour with offsetting increased and decreased flow area portions.

9. A blisk according to claim 6 wherein:

said blades include opposite suction and pressure sides; and said fluted channels have a maximum depth skewed toward said blade suction sides axially between said rim forward and aft ends.

10. A method of making said blisk according to claim 5 comprising:

fabricating said disk with planar stubs extending outwardly from said rim;

fabricating each of said blades with an integral fixturing collar disposed above said planar root thereof;

friction welding said planar root to said planar stub for each of said blades by translating said collar chordally; and machining said collar and weld flashing at said weld plane to complete said fillets thereat.

11. A method according to claim 10 wherein said disk is fabricated by:

analytically defining contour of said fluted channel between said stubs to achieve aerodynamic performance required by said blisk, including corresponding flow areas and surface contour of said flow passages between said blades; and fabricating said disk with said stubs and channels corresponding with said fluted contour thereof for positioning said weld planes in said fillets.

12. A method according to claim 11 wherein;

said analysis is first conducted to define an aerodynamic contour to achieve said aerodynamic performance and passage flow areas without regard to location of said weld planes;

a reference contour is defined to include said weld planes as best fit in said fillets; and said reference contour of said channels between said fillets is altered to match corresponding passage flow areas of said aerodynamic contour, and thereby define said fluted channels.

13. A method according to claim 12 wherein said aerodynamic contour and said reference contour are axisymmetric between said fillets, and said fluted channel is asymmetric relative thereto.

14. A method according to claim 12 wherein said first analysis is a two dimensional representation of said aerodynamic performance, and said aerodynamic performance of said fluted channels is determined using three dimensional analysis.

15. A method of repairing said blisk according to claim 5 comprising:

removing one of said blades from said disk rim at said weld plane to leave a planar stub; and friction welding a replacement blade to said stub by translating chordally a collar integrally joined to said replacement blade above a planar root thereof.

16. A method according to claim 15 further comprising machining said collar from said replacement blade, and machining weld flashing from said weld plane.

17. A compressor blisk comprising:

a disk including a rim having axially opposite forward and aft ends, and increasing in diameter therebetween;

a row of compressor blades extending radially outwardly from said rim in a unitary construction therewith to define corresponding flow passages therebetween;

said disk rim includes fluted inner flowpath channels for bounding said passages circumferentially between pressure and suction sides of adjacent ones of said blades and axially between leading and trailing edges of said blades, with each of said fluted channels diverging radially outwardly and varying in circumferentially arcuate contour axially between said rim forward and aft ends, and joining said blades at corresponding arcuate fillets;

said disk rim further including integral stubs each having a weld plane welded to a planar root of a corresponding blade, and said weld plane is disposed in said fillets; and said weld planes vary in radial distance from said fluted channels axially between said rim forward and aft ends.

18. A blisk according to claim 17 wherein said fluted channels vary in depth nonlinearly between said rim forward and aft ends, and said weld plane varies in radial position inside said fillets between said rim forward and aft ends.

19. A blisk according to claim 18 wherein said depth of said fluted channels varies both axially and circumferentially between said rim forward and aft ends.

20. A blisk according to claim 19 wherein each of said fluted channels has a maximum depth in circumferential contour which is disposed in the circumferential middle between adjacent blades at said leading edges, is skewed closer to said suction sides of said blades at midchords thereof, and is skewed closer to said pressure sides thereof at said rim aft end.

* * * * *

UNITED STATES PATENT AND TRADEMARK OFFICE
CERTIFICATE OF CORRECTION

PATENT NO.     : 6,478,545 B2
DATED          : November 12, 2002
INVENTOR(S)    : D.W. Crall et al.

It is certified that error appears in the above-identified patent and that said Letters Patent is hereby corrected as shown below:

<u>Column 7,</u>
Line 50, insert paragraph:
-- After the weld plane 42 is so best fit, an axisymmetric reference surface of revolution or contour 56 is defined to correspond with desirable fillets 38 introduced at the corresponding so-fitted planes. Whereas the aerodynamic contour 54 is defined for desired aerodynamic performance, the reference contour 56 is defined for the desired fillets 38, and the two contours are thusly different. --

Signed and Sealed this

Twenty-fourth Day of June, 2003

JAMES E. ROGAN
*Director of the United States Patent and Trademark Office*